(12) United States Patent
Gozcu (10) Patent No.: US 12,236,314 B2
(45) Date of Patent: Feb. 25, 2025

(54) METHODS AND SYSTEMS TO IDENTIFY AND GENERATE EXTENDABLE IDENTIFIER CODE

(71) Applicant: GRI AI Ltd, London (GB)

(72) Inventor: Emrah Gozcu, London (GB)

(73) Assignee: GRI AI Ltd, London (GB)

( * ) Notice: Subject to any disclaimer, the term of this patent is extended or adjusted under 35 U.S.C. 154(b) by 0 days.

(21) Appl. No.: 18/182,751

(22) Filed: Mar. 13, 2023

(65) Prior Publication Data

US 2023/0214616 A1   Jul. 6, 2023

Related U.S. Application Data

(63) Continuation of application No. PCT/IB2021/058226, filed on Sep. 9, 2021.

(51) Int. Cl.
*G06K 7/14*   (2006.01)

(52) U.S. Cl.
CPC .................. *G06K 7/1417* (2013.01)

(58) Field of Classification Search
CPC .......................... G06K 7/1417; G06K 7/143
USPC ...................................... 235/462.1
See application file for complete search history.

(56) References Cited

U.S. PATENT DOCUMENTS

| | | | |
|---|---|---|---|
| 9,892,300 B2* | 2/2018 | Hosokane | G06K 19/06037 |
| 2018/0174006 A1* | 6/2018 | Ryu | G06K 19/06037 |
| 2019/0147206 A1* | 5/2019 | Nakata | G11B 7/0045 |
| | | | 235/451 |
| 2019/0156092 A1* | 5/2019 | Liu | G06K 7/10 |
| 2021/0103786 A1* | 4/2021 | Yoshida | H04L 9/0861 |
| 2022/0036024 A1* | 2/2022 | Liu | G06K 7/1417 |

FOREIGN PATENT DOCUMENTS

| | | |
|---|---|---|
| WO | WO 2006/065565 A2 | 6/2006 |
| WO | WO 2018/064089 A1 | 4/2018 |

* cited by examiner

*Primary Examiner* — Ahshik Kim
(74) *Attorney, Agent, or Firm* — Van Hoven PC; Stefan D. Osterbur; Joshua Van Hoven (57) ABSTRACT

An aspect of the present disclosure provides a method of obtaining information from a two-dimensional optical pattern. An image is captured of the two-dimensional optical pattern, which includes plurality of optical quadrant having plurality of optical cell. Contours of the two-dimensional optical pattern are determined in the image determining locations in two dimensions of plurality of optical quadrant within the contours of the two-dimensional optical pattern. Further, the locations of optical cell placed around the optical quadrant are determined in two-dimensional geometric shape in the optical cell that are spliced apart from each other at predetermined locations in the optical cell with respect to the optical quadrant. The information content of the two-dimensional optical pattern is determined.

17 Claims, 10 Drawing Sheets

METHODS AND SYSTEMS TO IDENTIFY AND GENERATE EXTENDABLE IDENTIFIER CODE

CROSS-REFERENCE TO RELATED PATENT APPLICATIONS

This patent application is a continuation of International Application No. PCT/IB2021/058226, filed on Sep. 9, 2021, which claims the benefit of priority to United Kingdom Patent Application No. 2014378.0, filed Sep. 13, 2020, the entire teachings and disclosures of both applications are incorporated herein by reference thereto.

FIELD

The present application relates to the field of information technologies, and in particular, to methods and systems for identifying and generating extendable identifier code in the context of a two-dimensional optical pattern.

BACKGROUND

At the time of this application, there are two mainstream type of computer-generated identification codes which are barcodes and two-dimensional optical codes. The two-dimensional optical codes can carry a large amount of information while barcodes carry only an identification code that refers the specific object (e.g., the information, product, unique resource locator, etc) that it belongs to.

Generally, a basic usage of two-dimensional optical code representing data in a visual, machine-readable format requires the two-dimensional optical code to be printed using a printing system on a surface of a merchandised product, on an id card or a ticket. The printed two-dimensional optical code must be of a sub-millimetric resolution for a mobile computing device to be able to recognise and subsequently decode the information carried by the two-dimensional optical code.

Similarly, a barcode also requires to be printed using a printing system and a barcode reader must be used to recognise the barcode and extract information.

Both barcodes and two-dimensional optical codes may further include error correction code that may be used to mitigate any error or missing information. The error correction code can identify and recover missing information bits from the information content of a barcode or two-dimensional optical code when damaged, obscured, or otherwise not fully readable.

Embodiments of the present disclosure address the aforementioned problems and provide improved methods and systems for identifying and generating extendable identifier code.

SUMMARY

Aspects and embodiments of the present disclosure describe methods and systems for identifying and generating extendable identifier code. A computing device, e.g., a mobile phone or laptop having a connected camera or web cam, is used to capture an image that contains a two-dimensional optical pattern comprising optical quadrants wherein optical cell contains information. The two-dimensional optical pattern can carry 20-bit information that can be generated either with a computing device and printed, or simply by hand.

In embodiments of the present disclosure, the method may determine contours of a two-dimensional optical pattern in a captured image and also the location in two dimensions of optical cells that comprise two-dimensional geometrical shapes. Each quadrant may carry 5-bit of data with each optical pattern carrying 20-bits of information in total.

In a first embodiment two-dimensional optical patterns may be used to authorise a payment or financial transaction. A financial transaction generally involves a sender transferring funds to a beneficiary either directly or indirectly via a financial institution or payment provider. This is generally achieved by way of cash payment, credit or debit card payment, bank transfer or interaction with a payment gateway. The first embodiment of the present disclosure permits a user to register a unique two-dimensional optical pattern with a payment information registry. The registry may store information regarding identity, account information and the two-dimensional optical code. The account information may relate to the sender and/or the beneficiary. The two-dimensional optical code may be unique to a user, akin to a pin number or signature, or it may be unique to a specific transaction. In each case, the registry may be accessed by a web or mobile interface to generate the two-dimensional optical code and associate it with the required information. The generated two-dimensional optical code is stored on a computing device associated with the user. The information associated with the generated two-dimensional optical code is stored at a server. At a point of sale, a second individual may use a computing device to capture an image of the two-dimensional optical code that may be displayed to it by way of a computing device or a hand drawn image. The captured two-dimensional optical code is interrogated to identify if it contains contours representative of a two-dimensional optical code in a specific format. If relevant contours are identified, the image is filtered and cleaned to remove any extraneous and/or irrelevant data. The resulting image is interrogated to determine if it is representative of a two-dimensional optical pattern in the form of an ID image. Assuming that an ID image is identified, the orientation of the ID image is corrected. The ID image is then sliced into four separate quadrants, each quadrant comprising a plurality of optical cells and two-dimensional geometric shapes. Finally, the sliced image is decoded to determine the content of the data represented by a unique binary code.

A two-dimensional optical pattern according to embodiments of the invention may thus be used as an authentication code for a financial transaction or payment. This provides certain advantages over cash payments in terms of security and prevention of fraud. Furthermore, payment authentication in the manner described enables payment by bank transfer and/or credit and debit card without the need for a separate payment terminal. Payment authentication may also be achieved without access to the internet. For example, the beneficiary may download data to their mobile device that is representative of the authentication code. Upon capturing an image of the two-dimensional optical code from the sender, the beneficiary's computing device may generate an authentication code that is stored until an internet connection is re-established. The authentication code may then be automatically transmitted to the financial institution to complete the payment.

In some embodiments, a personal two-dimensional optical code may be captured at a point of sale. For example, a user may wish to purchase a coffee from a coffee shop. By displaying a personal two-dimensional optical code the user's computing device may receive a payment request from the coffee shop. The user may then decide whether to accept or refuse the payment request. The payment request may be accepted by selecting a pop up displayed on a touch screen of the computing device or by entering a pin number or using facial recognition, for example.

In a second embodiment two-dimensional optical patterns may be used to identify an object or person over a long distance. There are many ways in which this embodiment could be put into effect. In a situation where there is a crowd of people in close proximity, i.e., at an airport or at a sports event, each person may wear, or otherwise present or display, a two-dimensional optical pattern that is representative of their identity and/or other information. Using methods described herein, an optical sensor may scan a crowd of people and capture two-dimensional optical codes associated with each person. Data associated with each two-dimensional optical code may be sent from the optical sensor to a computing device. The computing device may retrieve information from a server in respect of each, or a sub-set of, the captured two-dimensional optical code. The computing device may display identity information relating to each, or a sub-set of, the captured two-dimensional optical codes. This information may be used to identify a specific person or object. For example, the computing device may identify all British passport holders at Heathrow Airport. Those individuals may be automatically directed into a fast-track immigration lane. In another example, all individuals who have been vaccinated against COVID-19 may be identified and directed towards an entry point at a sports stadium whereas those individuals not displaying a two-dimensional optical code may directed to a separate entry point for testing and further processing. In yet another example, a camera may be used to capture a two-dimensional optical code on a billboard, for example, to retrieve additional information relating to the subject matter of the advertisement represented on the billboard. The aforementioned examples are given by way of example only and shall not be considered limiting.

In a third embodiment two-dimensional optical patterns may be used to identify every product in a physical store. An individual shopper may first be identified using a unique two-dimensional optical pattern, or through any other identification means. As the shopper walks around the store and picks up goods, the two-dimensional optical code for each object may be recognised and the associated goods added to the shopper's digital basket. If the shopper puts the goods back on the shelf they are removed from the shopper's digital basket. When the shopper leaves the store their pre-stored payment method is charged for the goods that it is determined the shopper has taken from the store.

In a fourth embodiment two-dimensional optical patterns may be used to identify products in a warehouse or other storage area. Each object in the warehouse may display a two-dimensional optical pattern. A drone equipped with an optical sensor may be used to fly over the products and identify each product. Information associated with each product is transmitted from the drone to a computing device. The computing device may then tally the quantity of each product located in the warehouse.

In a fifth embodiment two-dimensional optical patterns may be used in conjunction with road traffic signs. Autonomous vehicles equipped with optical sensors may read the two-dimensional optical patterns on road signs to interpret the data displayed by such road signs. Existing road signs may be marked with two-dimensional optical patterns by hand drawing a pattern on a road sign or by attaching a sticker or label, for example.

In a sixth embodiment two-dimensional optical patterns may be used in connection with postage and shipping of packages. A single two-dimensional optical code may be associated with both sender and recipient details. A sender may draw, or otherwise attach, a two-dimensional optical code to a package at the point of sending a package. This two-dimensional optical code may be scanned at a depot to retrieve the relevant information to: a) identify an address to send the package to; and b) identify the sender to charge the postage costs to the sender. A separate two-dimensional optical code may quickly be drawn on packages at the depot to enable packages to be automatically sorted by conveyor systems.

An aspect of the present invention provides a method of obtaining information from a two-dimensional optical pattern, the method comprising: capturing an image including the two-dimensional optical pattern, the two-dimensional optical pattern comprising a plurality of optical quadrants each comprising at least one optical cell; determining contours of the two-dimensional optical pattern included in the image; determining locations in two dimensions of the plurality of optical quadrants by identifying contours of each optical quadrant of the two-dimensional optical pattern; determining locations in two dimensions of each of the at least one optical cells within each respective optical quadrant; locating a plurality of two-dimensional geometric shapes in each optical cell that are spliced apart from each other at predetermined locations in the optical cell with respect to the optical quadrant; and determining the information content of the two-dimensional optical pattern.

Further areas of applicability of the present invention will become apparent from the detailed description provided hereinafter. The detailed description and specific examples, while indicating the preferred embodiment of the invention, are intended to be given by way of example only.

BRIEF DESCRIPTION OF DRAWINGS

Accompanying drawings illustrate example embodiments of present disclosure and should not be considered as limiting its scope.

DETAILED DESCRIPTION

The following description of the preferred embodiment(s) is merely exemplary in nature and is no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention.

Embodiments of the present disclosure relate to mobile computing devices and, more particularly, but not by way of limitation, to detecting and processing a two-dimensional optical pattern which may be computer generated and printed using a printing system or hand-written.

In-various example embodiments, a two-dimensional optical pattern is described that uses a functional pattern which is easy to memorise. This enables users to recall the pattern from memory and write by hand without needing to use a computing device to generate the pattern and a printing device to print it. Regardless of whether the pattern is generated by a computing device or written by hand, it is never-the-less a machine readable two-dimensional optical pattern.

In addition, a plurality of two-dimensional optical patterns can be used together to carry more information. This is an extendable feature of embodiments of present disclosure.

In various example embodiments, a two-dimensional optical pattern that can be easily memorized and hand-written provides the user with an easy to remember, branded code that allows for an exclusive user experience associated with the novel two-dimensional optical pattern.

In a specific example, a group of travellers reach a security checkpoint at an airport and identify themselves using hand-written two-dimensional optical patterns. Each traveller will have previously entered their identity and travel document details in a web application which is running at a server. Each traveller is associated by the web application with a unique two-dimensional optical pattern with respect to the travellers' identity information and/or travel documents. The server system also has an application interface that can validate the printed or hand-written two-dimensional optical pattern.

In an example embodiment, a two-dimensional optical pattern system receives image data representing an image from a user device. For example, an image of a hand-written two-dimensional optical pattern is acquired by an optical sensor (e.g., a photo sensor, CCD Camera, LIDAR) of a mobile device of the user. In various embodiments, the image data from the mobile device of the user is received by the server in response to an Access Authentication request or a unique resource identifier response of a recorded data (e.g., travel information, rapid diagnostic test result).

The description that follows includes systems, methods, functions instructions and computing machine program products that embody illustrative embodiments of this disclosure. In this following description, there are numerous examples and specific details of methods in order to provide understanding of various embodiments of the present disclosure. It will be evident, however, to those skilled in the art, that certain embodiments of the present disclosure may be practiced without these specific details. Well-known instruction instances, protocols, structures, and techniques are not necessarily shown in detail.

Figure 1:
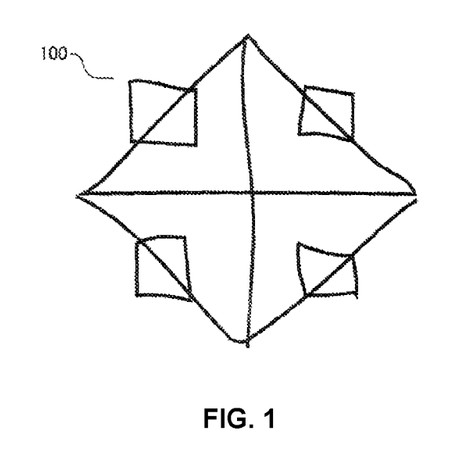
FIG. 1 shows an example a hand-written two-dimensional optical pattern as an example embodiment of present disclosure.

FIG. 1 is an example hand-written two-dimensional optical pattern 100, wherein the two-dimensional optical pattern carries 20-bit information. The two-dimensional optical pattern is hand-written and comprises a plurality of optical cells each comprising a plurality of two-dimensional geometric shapes. The two-dimensional optical pattern shown in FIG. 1 forms a skeleton 106 that is similar to a "Cartesian Coordinate System" and divides the two-dimensional optical pattern into four distinct quadrants 102a, 102b, 102c, 102d wherein each quadrant 102a-d comprises an optical cell consisting of a plurality of two-dimensional geometric shapes 104 rotated around the skeleton with respect to their position.

The cross shaped skeleton 106 is also a marker object for the method which is detectable using Computer Vision algorithms (e.g., Hough Edge Detection, Deep Learning Image Segmentation). The marker object 106 can be used to fix the orientation and size of geometric shapes 104 with respect to its boundaries.

Figure 2:
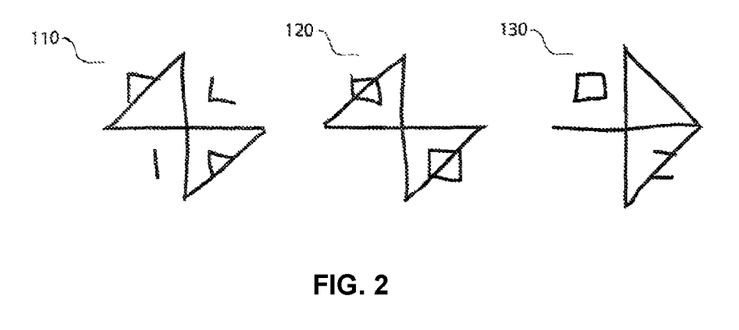
FIG. 2 shows an example image of a hand-written two-dimensional optical pattern 110 encodes binary 11001001001100100011 and example a hand-written two-dimensional optical pattern 120 encodes decimal 11111000001111100000 and example a hand-written two-dimensional optical pattern 130 encodes decimal 01111000001101010000.

FIG. 2 illustrates three separate two-dimensional optical pattern examples. A first two-dimensional optical pattern 110 represents binary 11001001001100100011. A second two-dimensional optical pattern 120 represents binary 11111000001111100000. A third two-dimensional optical pattern 130 represent binary 01111000001101010000.

In some embodiments, single or multiple hand-written two-dimensional optical patterns can be used to represent a single identification code.

One or more two-dimensional optical patterns can extend the data to be stored. The two-dimensional optical patterns illustrated in FIG. 2 can carry 60-bit information.

Figure 3:
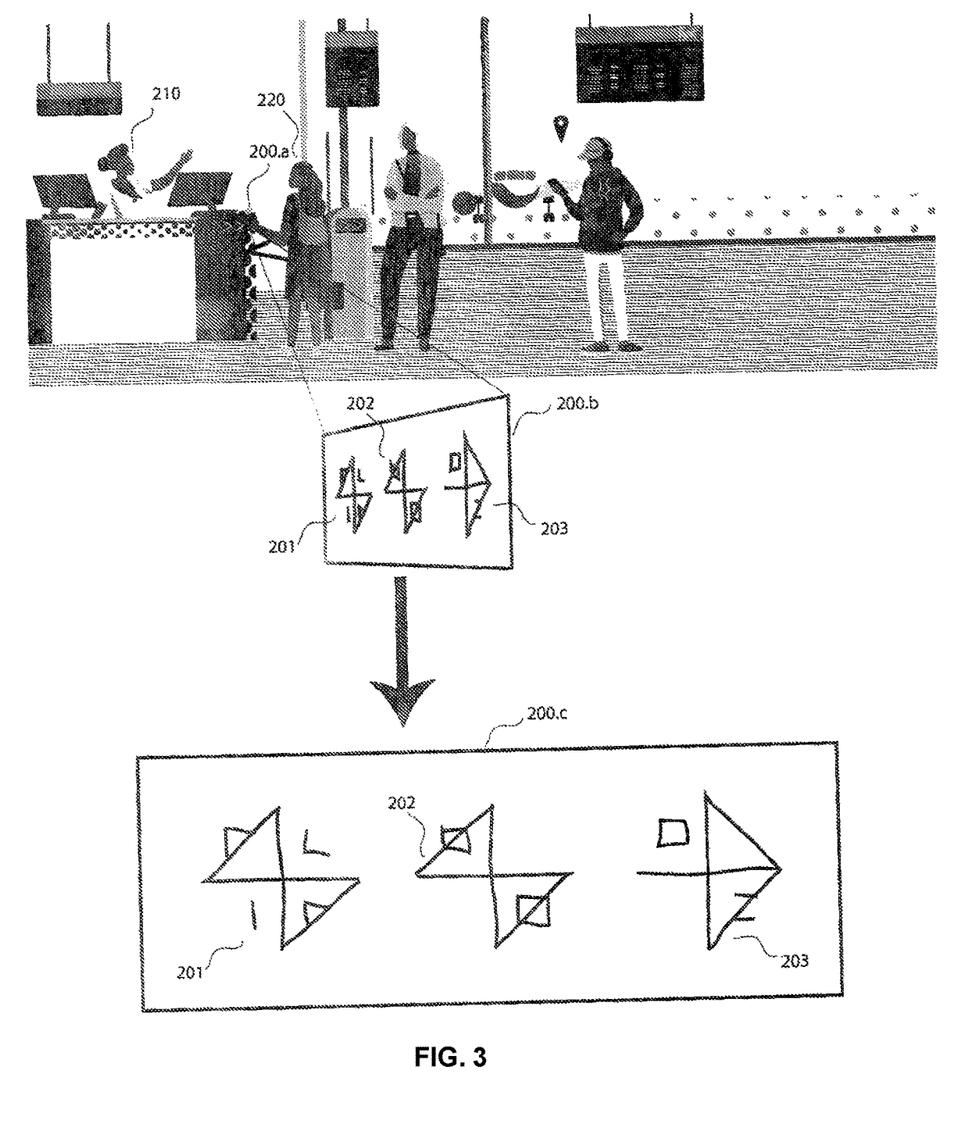
FIG. 3 illustrates an example usage of a hand-written two-dimensional optical pattern on a security checkpoint.

FIG. 3 illustrates an example hand-written two-dimensional optical pattern in which the encoded content is an identification code used in a security checkpoint.

Security officer 210, using an end-user device, scans a plurality of two-dimensional optical patterns 200.a which identify a person 220. The two-dimensional optical patterns illustrated in FIG. 3 201, 202, 203 each represent 60 bits of data.

Callout 200.b shows the contour of a plurality of two-dimensional optical patterns that each carry 60 bits of data. The two-dimensional optical patterns can be drawn on any flat surface, e.g., a piece of paper, a tablet screen, a shirt etc. Callout 200.*c* illustrates the spatial orientation of the two-dimensional optical codes illustrated in callout 200.*b*.

Figure 17:
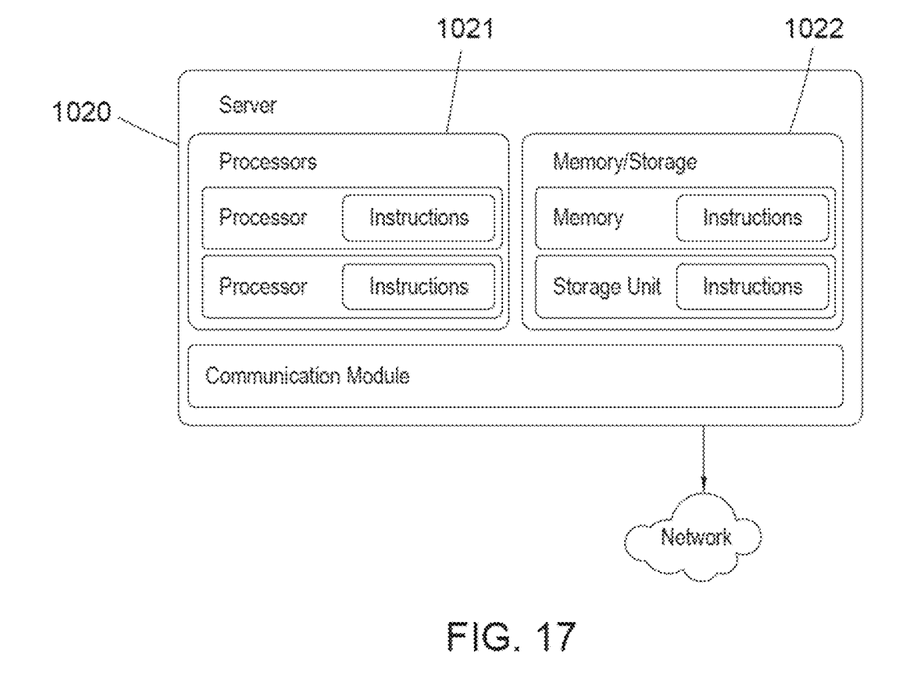
FIG. 17 shows a schematic structural diagram illustrating a server according to an implementation of present specification.

An individual 220 can use a web application to register a unique two-dimensional optical which can be hand-written. For this particular example as shown in FIG. 3, individual 220 may be a traveller who wants to get authorization to enter a country on a security checkpoint. The traveller has already been asked for some information which must be completed before the visit for security purposes and they have entered the required information on a web application which is hosted in a server (as illustrated in FIG. 17) and managed by a government body. The web application can issue a unique two-dimensional optical pattern that contains data representative of the traveller's identity. Traveller 220 can write the given two-dimensional optical pattern on a piece of paper 200.*a* and show it to the security officer 210. Security officer 210 can use a computing device to read the two-dimensional optical code and validate the traveller's identity.

An image of the two-dimensional pattern 200.*a* is computer readable. Once it is read by optical sensors the image is rotated and skewed using image processing libraries (e.g., OpenCV, Image) and as a resulting image data 200.*b* is stored in the memory of the computer.

Figure 4:
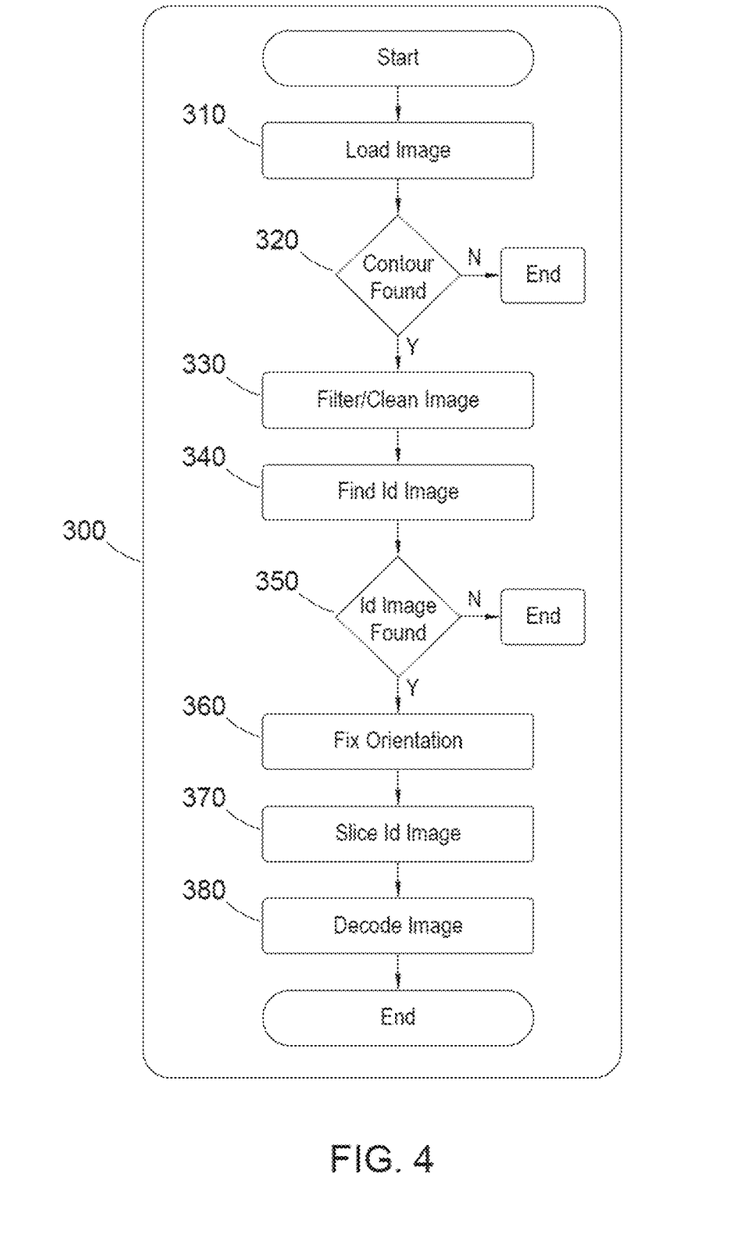
FIG. 4 shows a flow diagram of an example method for reading a hand-written two-dimensional optical pattern and decoding information.

FIG. 4 is a flow diagram illustrating a method for decoding the code carried by a two-dimensional optical pattern. The method instructions are stored in memory/storage (see FIG. 16—1002) in a computing device 1000 and executed by a processor of the computing device.

The method of FIG. 4 may specifically include following steps:

At operation 310, the computing device 1000 loads an image, using its optical sensors in the device module 1010. Optical sensor can be any electronic sensor, for example: a CCD (charge-coupled device) camera, passive or active infrared sensor (or LIDAR wherein the two-dimensional optical pattern is engraved on a surface). In another example of the embodiment of the present disclosure, the operation can also execute the instructions which are stored in the memory/storage (see FIG. 16—1002) to load the image that is stored electronically in storage media or another set of instructions that belongs to external systems.

At operation 320, similar to existing two-dimensional codes, a function needs to determine the contour of the two-dimensional optical pattern, which may be hand-written. The function can be a pixel processing library, set of operations (e.g., OpenCV, Image, TensorFlow, PyTorch etc.). A contour, in two dimensions, indicates the boundaries of the plurality of two-dimensional optical patterns. If contours are identified in an image and the image contains at least one two-dimensional optical pattern, the data in the detected contour is stored and all extraneous data is ignored and/or deleted. The resulting image contains only the portion of the initial image that is relevant and the method proceeds to operation 330.

At operation 330, the computing device executes instructions to filter and clean the image to remove any extraneous or irrelevant data from the image. Gaussian Blur and/or Threshold filters can be applied to the contours of the image to remove any surface noise and/or light effects.

At operation 340, the computing device executes instructions to identify a location of the two-dimensional optical pattern. The image may comprise a hand-written two-dimensional optical pattern so, the method utilizes computer programs (e.g., Computer Vision, TensorFlow, PyTorch) and Edge Detection algorithms (e.g., Hough Edge Detection).

At operation 350, the end-user device executes instructions that checks the detected features of the image. If no hand-written two-dimensional optical pattern is found, the method re-starts at operation 310. If a handwritten two-dimensional optical pattern is found, the method proceeds to operation 360.

At operation 360, found hand-written optical patterns may be tilted in one or more directions and/or skewed. The computing device executes instructions to fix the spatial orientation and shape of the two-dimensional optical pattern using computer programs/libraries/methods (e.g., Skew, Rotate).

At operation 370, the computing device executes instructions to slice the plurality of two-dimensional optical patterns into a plurality of quadrants. At operation 380, the computing device executes instructions to decode the resulting image.

Figure 5:
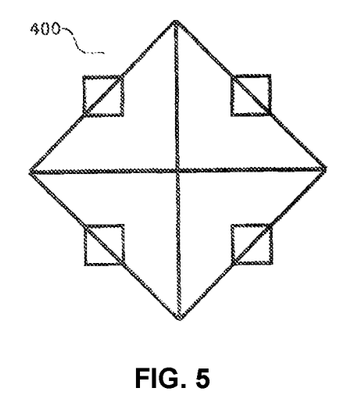
FIG. 5 shows an example computer-generated and printed two-dimensional optical pattern as an example embodiment of present disclosure.

FIG. 5 is an example of a computer-generated two-dimensional optical pattern 400, wherein the two-dimensional optical pattern carries 20-bit information. The two-dimensional optical 400 pattern comprises a plurality of optical cells comprising a plurality of two-dimensional geometric shapes and may be printed using a printer system.

As shown in FIG. 5, the two-dimensional optical pattern forms a skeleton 402 that is similar to a "Cartesian Coordinate System" and divides the two-dimensional optical pattern into four quadrants 404*a*, 404*b*, 404*c*, 404*d* wherein each quadrant 404*a*, 404*b*, 404*c*, 404*d* comprises a plurality of optical cells consisting of a plurality of two-dimensional geometric shapes 406 around the skeleton 402 with respect to their position.

The cross shaped skeleton 402 is also a marker object for the method which is detectable using Computer Vision algorithms (e.g., Hough Edge Detection, Deep Learning Image Segmentation). The marker object 402 can also be used to fix the orientation and size of each two-dimensional geometric shape 406 with respect to its boundaries.

Figure 6:
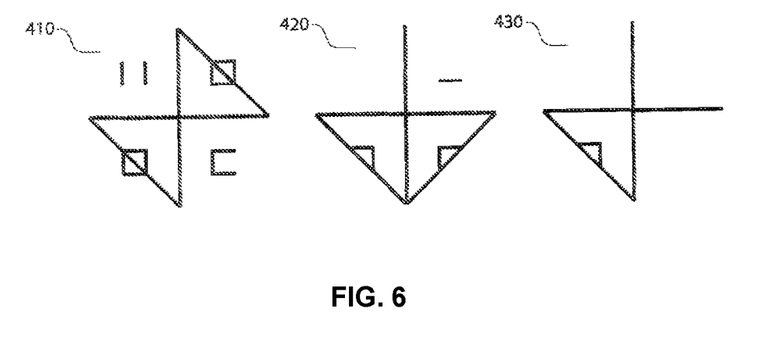
FIG. 6 shows plurality of example computer-generated and printed two-dimensional optical pattern.

FIG. 6 illustrates three separate two-dimensional computer-generated optical patterns. A first two-dimensional computer-generated optical pattern 410 represents binary 00101111110111011111. A second two-dimensional computer-generated optical pattern 420 represents binary 00000101101011001000. A third two-dimensional computer-generated optical pattern represents binary 00000101100000000000.

In some embodiments, single or multiple hand-written two-dimensional optical patterns can be used to represent a single identification code.

Figure 7:
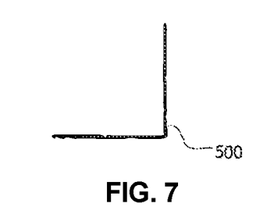
FIG. 7 shows an optical quadrant.

FIG. 7 illustrates a single optical quadrant 500 which may store optical elements comprising a plurality of two-dimensional geometric shapes. Each optical quadrant 500 may carry 5-bits of information. The optical quadrant 500 also is a helper object to segment and arrange four groups of optical elements in a two-dimensional optical pattern, each group of optical elements being stored in a respective optical quadrant 500.

Figure 8:
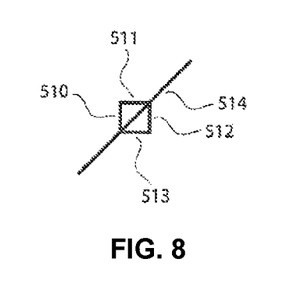
FIG. 8 illustrates an optical cell comprising plurality of two-dimensional geometric shape carry 5-bit information.

At FIG. 8, illustrates an optical element comprising plurality of two-dimensional geometric shape. The geometric shape sides positioned on a respective optical cell, which carry 5-bit information.

FIG. 8 illustrates a group of optical elements. The most significant bit 514 of the group of illustrated optical element carries value $2^4$ (decimal 16). The second most significant bit 511 of the illustrated group of optical elements carries $2^3$ (decimal 8). The third most significant bit 510 of the group of illustrated optical elements carries value $2^2$ (decimal 4). The fourth most significant bit 512 of the illustrated group of optical elements carries value 21 (decimal 2). The least significant bit 513 of the group of illustrated optical elements carries value 20 (decimal 1).

Figure 9:
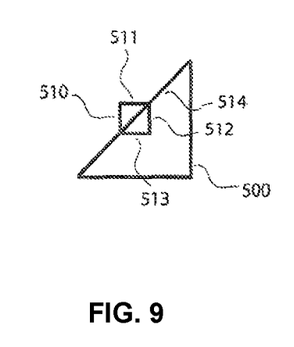
FIG. 9 illustrates the optical quadrant wherein the optical cell comprising plurality of two-dimensional geometric shape.

FIG. 9 illustrates an optical quadrant which stores a group of optical elements comprising a plurality of two-dimensional geometric shapes that carry 5-bits of information. This particular embodiment has 5 optical cells which carries 11111 as binary which is decimal 31. The optical cells are identified as 510-514.

Figure 10:
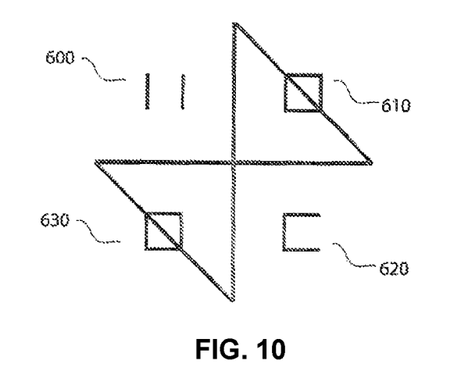
FIG. 10 illustrates a two-dimensional optical pattern comprising four quadrants wherein each quadrant has a vertex, and wherein said target centroid is adjacent to said quadrant vertex.

FIG. 10 illustrates another computer-generated two-dimensional optical pattern 600 that carries 20-bits of information. The illustrated two-dimensional optical pattern 600 comprises a plurality of optical cells. Each of the plurality of optical cells comprises a plurality of two-dimensional geometric shapes 602 and may be printed using a printer system.

The two-dimensional optical pattern 600 forms a skeleton 604 that is similar to a "Cartesian Coordinate System" and divides the two-dimensional optical pattern into four quadrants 606a, 606b, 606c, 606d. Each quadrant 606a, 606b, 606c, 606d comprises a plurality of optical cells consisting of a plurality of two-dimensional geometric shapes 602 around the skeleton 604 with respect to their position.

The cross shaped skeleton 604 is also a marker object which may be detectable using Computer Vision algorithms (e.g., Hough Edge Detection, Deep Learning Image Segmentation). The marker object 604 can be used to fix the orientation and size of geometric shapes 602 with respect to its boundaries.

Figure 11:
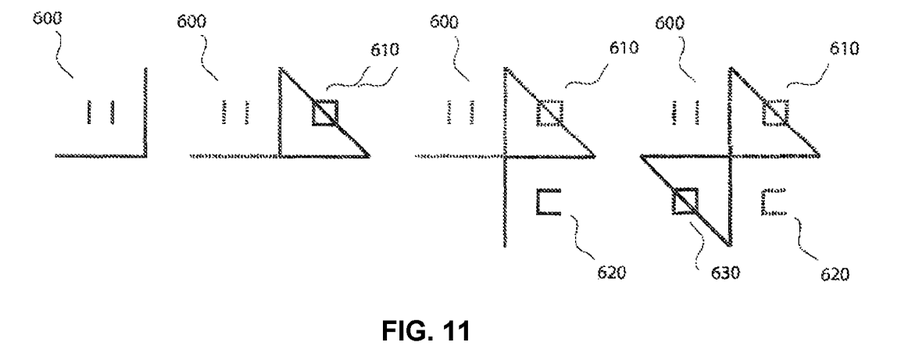
FIG. 11 further illustrates a method for building said two-dimensional optical pattern, wherein plurality of optical quadrants and plurality of optical cell.

FIG. 11 illustrates the two-dimensional optical pattern 600 as four separate two-dimensional optical quadrants which each carry 5-bits of information to make a total of 20-bits of information. Each two-dimensional optical quadrant may be rotated and placed with respect to its position in a Cartesian coordinates system.

A First group of two-dimensional geometric shapes 602a is placed in quadrant 608. A second group of two-dimensional geometric shapes is placed in quadrant 610 and rotated 90° clockwise. A third group of two-dimensional geometric shapes is placed in quadrant 620 and rotated 180° clockwise. A fourth group of two-dimensional geometric shapes is placed in quadrant 630 and rotated 270° clockwise. This creates the two-dimensional optical pattern illustrated at FIG. 10.

Figure 12:
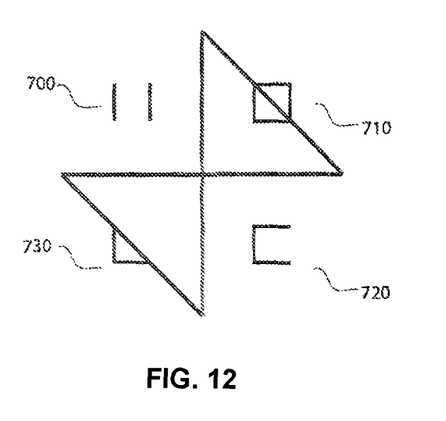
FIG. 12 shows an example computer-generated and printed two-dimensional optical pattern as an example embodiment of present disclosure.

FIG. 12 is another example of a computer-generated two-dimensional optical pattern 700, wherein the two-dimensional optical pattern 700 carries 20-bit information. The two-dimensional optical pattern 700 comprises a plurality of optical cells comprising a plurality of two-dimensional geometric shapes 702 and may be printed using a printer system.

The two-dimensional optical pattern 700 forms a skeleton 704 that is similar to a "Cartesian Coordinate System" and divides the two-dimensional optical pattern 700 into four quadrants 706a, 706b, 706c, 706d wherein each quadrant 706a, 706b, 706c, 706d comprises a plurality of optical cells consisting of a plurality of two-dimensional geometric shapes 702 around the skeleton 704 with respect to their position.

Figure 13:
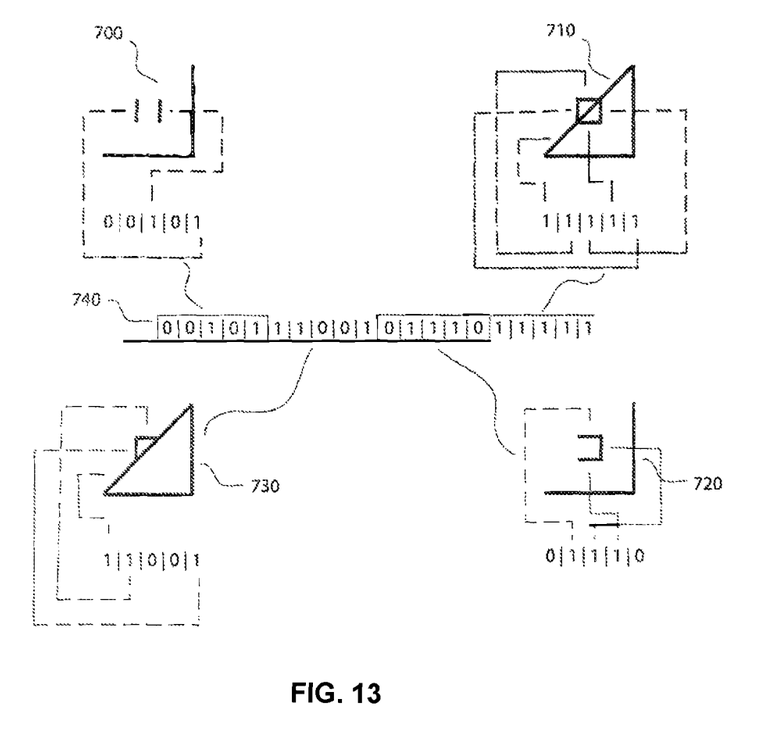
FIG. 13 illustrates plurality of optical cell, wherein each optical cell carries 5-bit information and bitorder instruction.

As shown in FIG. 13, the two-dimensional optical pattern 700 represents binary 00101110010111011111. Each two-dimensional optical element's information content can be obtained as per the method illustrated in FIG. 8.

Reed-Solomon codes may be used in conjunction with embodiments of the invention to correct errors in decoding of two-dimensional optical patterns. Reed-Solomon codes may be error correction codes with a wide range of applications on electronic data transmission systems. Reed-Solomon has a characteristic of correcting data errors computationally efficient manner, that characteristic of the Reed-Solomon is used on saving data in the storages. Some of the application of Reed-Solomon are: Wireless Transmission Systems, Internet Modems, Digital TV broadcasting, Storage Devices (e.g., CDs/DVDs, barcodes).

Reed-Solomon codes may also be block-based error correction codes, wherein redundant information is appended to information so that it can be recovered reliably in case of any errors in storage or transmission. On the other hand, embodiments of the present disclosure are extendable two-dimensional optical pattern that can carry information that is computer-readable and in chunks of 20-bit of data. In the case of Reed-Solomon codes included in the information, the data such that the information is remain in less than the total number of the optical cells, to solve such issue; extra two-dimensional optical pattern can be added to create plurality of two-dimensional optical pattern which can carry all the information that is necessary, including Reed-Solomon codes.

Figure 14:
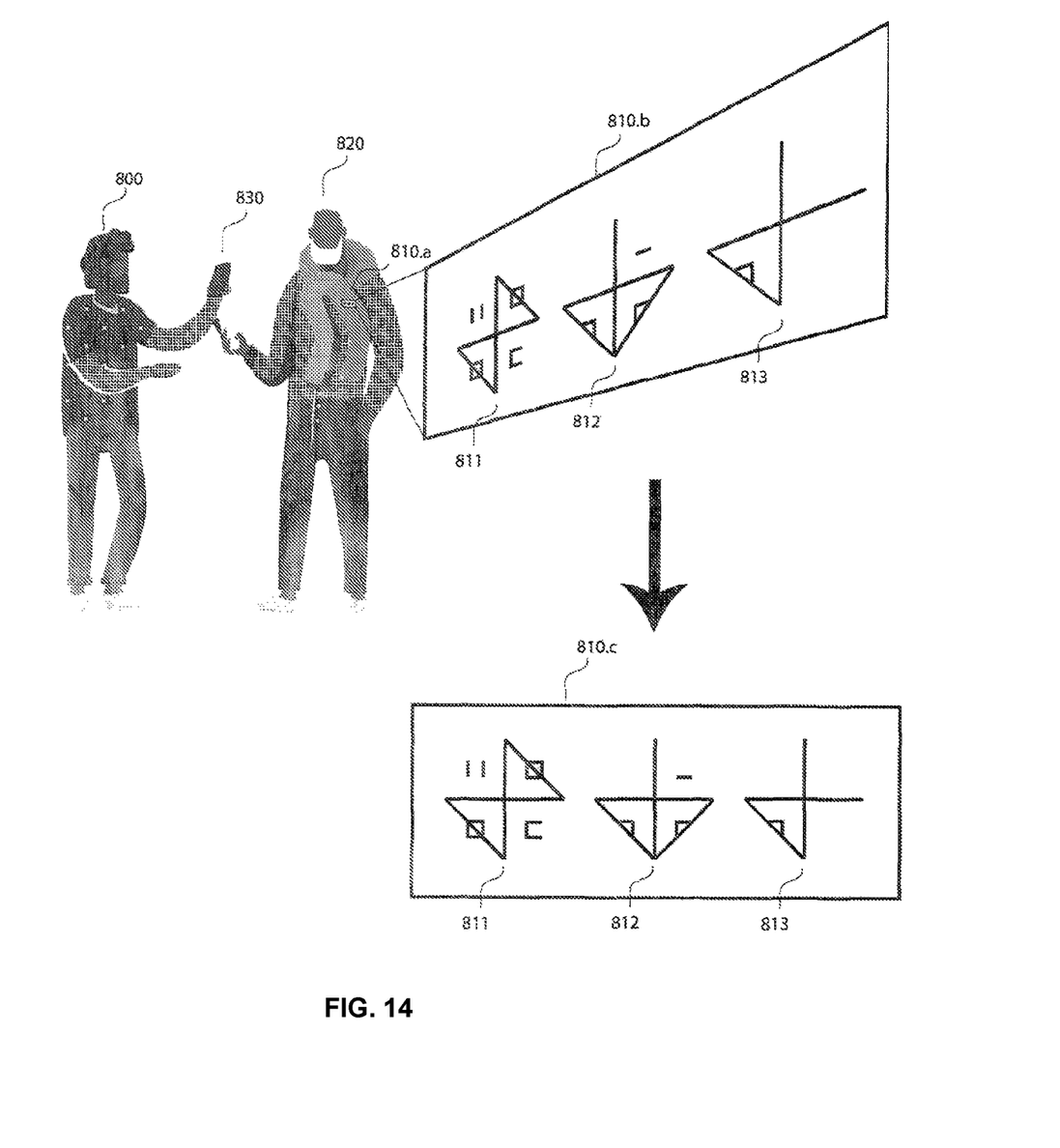
FIG. 14 illustrates an example usage of the computer-generated two-dimensional optical pattern to share information.

FIG. 14 illustrates an example of a computer-generated two-dimensional optical pattern in which the encoded content is an identification code used to share information between users who both have a mobile device. The person 800 who receives information, using a computing device 830, scans the two-dimensional optical pattern 810 which contains information that belongs to another person 820.

The two-dimensional optical pattern 800 is a pattern that uses plurality of geometrical shapes and each (811, 812, 813) represent 20 bits of data. Callout 810.*b* shows the contour of several two-dimensional optical patterns 811, 812, 813 that together carry 60 bits of data on a single piece of paper or any other flat surface or on a mobile device display, Callout 810.*c* shows the spatial orientation of the two-dimensional optical pattern 800 illustrated in Callout 810.*b*.

Figure 15:
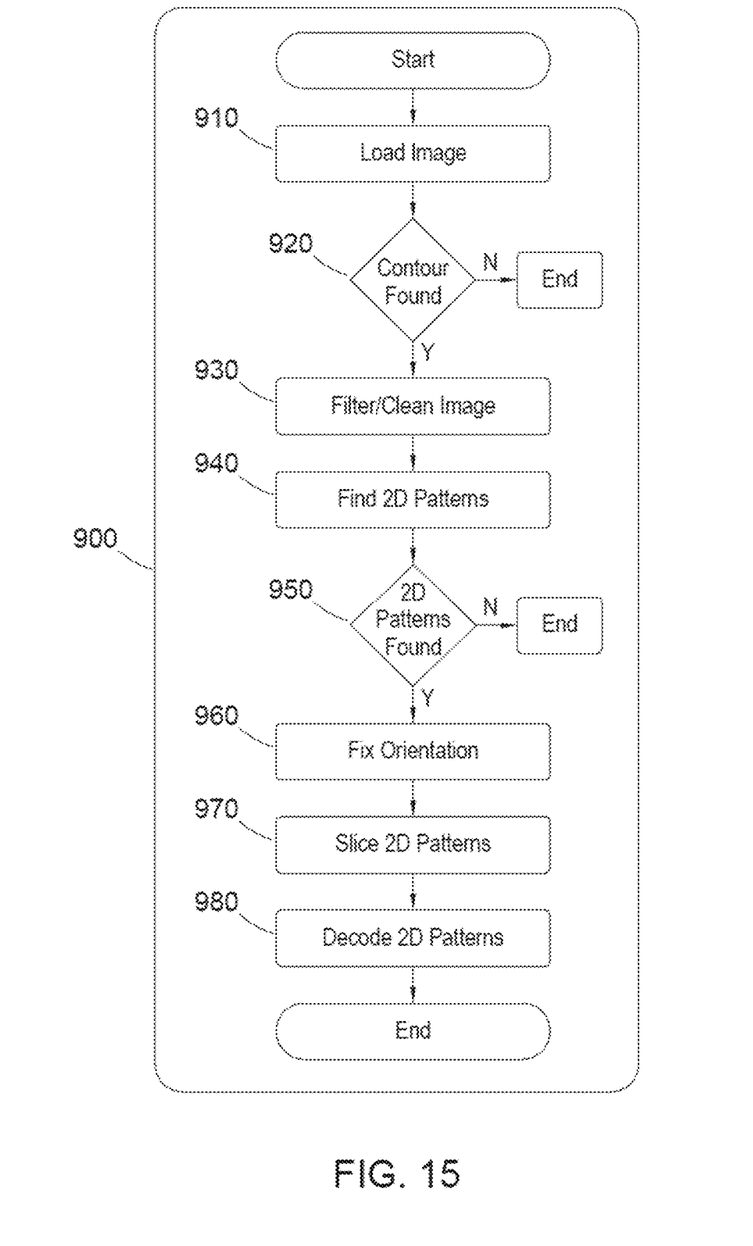
FIG. 15 shows a flow diagram illustrating an example method for reading computer-generated two-dimensional optical pattern and decoding information.

FIG. 15 is a flow diagram illustrating another method for decoding information encoded in a two-dimensional optical pattern. The method instructions are stored in memory/storage (see FIG. 16—1002) of a computing device 1000 and executed by a processor of the computing device 1000. The method may specifically include the following steps:

At operation 910, the computing device 1000 loads an image, using its optical sensors. Optical sensor can be any electronic sensor, for example; a CCD (charge-coupled device) camera, passive or active infrared sensor (or LIDAR wherein the two-dimensional optical pattern is engraved on a surface). In another example of the embodiment of the present disclosure, the operation can also execute the instructions which are stored in the memory/storage (see FIGS. 16—1002) to load an image that is stored electronically in storage media or another set of instructions that belongs to external systems.

At operation 920, similar to existing two-dimensional codes, a function needs to determine a contour of the two-dimensional optical pattern which is computer-generated. The function can be a pixel processing library, set of operations (e.g., OpenCV, Image, TensorFlow, PyTorch etc.). A contour, in two dimensions, indicates the boundaries of the plurality of a two-dimensional optical pattern. If contours are found indicative of the image containing at least one two-dimensional optical pattern, the method stores the data in the detected contour and deletes and/or removes any extraneous data. The resulting image contains only a portion of the initial image that is relevant and method proceeds to operation 630.

At operation 930, the computing device executes instructions to filter and clean the image of extraneous or irrelevant data. Gaussian Blur and/or Threshold filters can be applied to the contour of the image to remove surface noise and/or any light effects.

At operation 940, the computing device executes instructions to find a two-dimensional optical pattern. The image contains computer-generated two-dimensional optical pattern so, the method utilizes computer programs (e.g., Computer Vision, TensorFlow, PyTorch) and Edge Detection algorithms (e.g., Hough Edge Detection).

At operation 950, the computing device executes instructions to check the detected features of the image. If a two-dimensional optical pattern is not found, the method restarts at operation at operation 910. If a two-dimensional optical pattern is found, the method proceeds to operation 960.

At operation 960, found two-dimensional optical patterns may be tilted in one or more directions and skewed. The computing device executes instructions to fix the spatial orientation and shape of the two-dimensional optical patterns using computer programs/libraries/methods (e.g., Skew, Rotate).

At operation 970, the end-user device executes instructions to slice the plurality of two-dimensional optical patterns into a plurality of quadrants. At operation 980, the computing device executes instructions to decode the resulting image.

Figure 16:
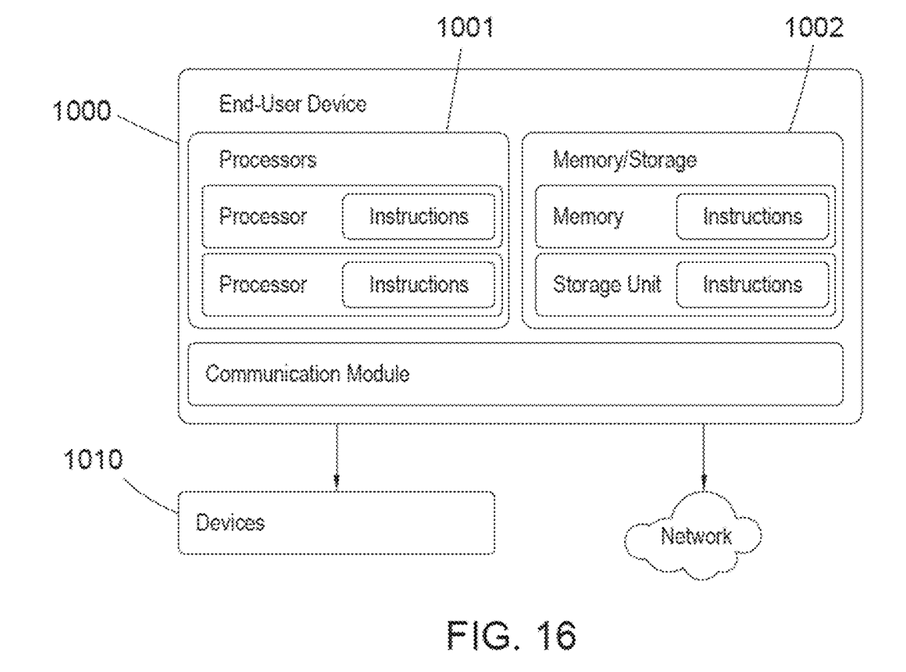
FIG. 16 shows a schematic structural diagram illustrating an end-user device according to an implementation of present specification.

FIG. 16 illustrates an example architecture of components of a general computing device 1000 that may be used in accordance with embodiments of the invention. The computing device may comprise: processors 1001, memory/storage 1002 and communication module 1003.

A computing-device 1000 may have executable instructions, including implementation of the methods, modules. graphics libraries (e.g., an OpenCV framework that illustrated and can represent, for example, processing, filtering, finding images & patterns), database libraries (e.g., SQLite having associated various relational database functions), web libraries (e.g., WebKit that may provide web browsing functionality), and represent the executable instructions of the software architecture.

A computing device 1000 may also include memory and storage in an example embodiment, the libraries include modules, which also have executable instructions imaging libraries that provide image processing.

Devices 1010 may also comprise other optic image capture functionality, executable instructions stored in memory 1002 that can be utilized by the processor 1001.

The architecture of FIG. 16 is shown as a block diagram illustrating components of a software components/modules. For example, the end-user-device 1000, according to some example embodiments, works may provide various graphic user interface able to read instructions from a machine-readable medium (GUI) functions, resource management, and perform any level location services.

FIG. 17 is a block diagram illustrating components of a software components/modules. For example, the server 1010, according to some example embodiments, works may provide various graphic user interface able to read instructions from a machine-readable medium (GUI) functions, resource management, and perform any level location services.

The server at FIG. 17, depends on the implementation of the embodiment of current disclosure, responsible creating two-dimensional optical pattern as authorization code, authentication of a user provided with two-dimensional optical pattern and returning stored target information with respect to two-dimensional optical pattern. This target information can be a simple text such as URL, phone number or e-mail address or all of them.

The above embodiments are exemplary only, and other possibilities and alternatives within the scope of the appended claims will be apparent to those skilled in the art.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of obtaining information from a two-dimensional optical pattern, the method comprising:
    capturing an image including the two-dimensional optical pattern, the two-dimensional optical pattern comprising a plurality of optical quadrants each comprising at least one optical cell, wherein said two-dimensional optical pattern is hand written;
    determining contours of the two-dimensional optical pattern included in the image;
    determining locations in two dimensions of the plurality of optical quadrants by identifying contours of each optical quadrant of the two-dimensional optical pattern;
    determining locations in two dimensions of each of the at least one optical cells within each respective optical quadrant;
    locating a plurality of two-dimensional geometric shapes in each optical cell that are spliced apart from each other at predetermined locations in the optical cell with respect to the optical quadrant; and determining the information content of the two-dimensional optical pattern.

2. The method of claim 1, wherein said two-dimensional optical pattern, comprises a plurality of optical cells carrying 20 bits of information.

3. The method of claim 1, wherein said obtaining said information comprises decoding said information.

4. The method of claim 1, wherein said two-dimensional optical pattern has a target centroid, and wherein said quadrant has a vertex, and wherein said target centroid is adjacent to said quadrant vertex.

5. The method of claim 1, wherein said plurality of optical quadrants are arranged in four, non-touching segments.

6. The method of claim 1, wherein said optical cell contains a plurality of two-dimensional geometric shapes that are located within a quadrant.

7. The method of claim 1, wherein said obtaining information further comprises executing an error correction algorithm.

8. A non-transitory computer-readable storage medium comprising instructions which, when executed by hardware processing circuitry, configure the hardware processing circuitry to perform actions comprising:

capturing an image including a two-dimensional optical pattern, the two-dimensional optical pattern comprising a plurality of optical quadrants each comprising at least one optical cell, wherein said two-dimensional optical pattern is hand written;

determining contours of the two-dimensional optical pattern included in the image;

determining locations in two dimensions of the plurality of optical quadrants by identifying contours of each optical quadrant of the two-dimensional optical pattern;

determining locations in two dimensions of each of the at least one optical cells within each respective optical quadrant;

locating a plurality of two-dimensional geometric shapes in each optical cell that are spliced apart from each other at predetermined locations in the optical cell with respect to the optical quadrant; and determining the information content of the two-dimensional optical pattern.

9. The non-transitory computer-readable storage medium of claim 8, wherein said two-dimensional optical pattern, comprises a plurality of optical cells carrying 20 bits of information.

10. The non-transitory computer-readable storage medium of claim 8 wherein said obtaining said information comprise decoding said information.

11. The non-transitory computer-readable storage medium of claim 8, wherein said two dimensional optical pattern has a target centroid, and wherein said quadrant has a vertex, and wherein said target centroid is adjacent to said quadrant vertex.

12. The non-transitory computer-readable storage medium of claim 8, wherein said plurality of optical quadrants are arranged in four, non-touching segments.

13. The non-transitory computer-readable storage medium of claim 8, wherein said optical cell contains a plurality of two-dimensional geometric shapes located within a quadrant.

14. The non-transitory computer-readable storage medium of claim 8, wherein said obtaining information further comprises executing an error correction algorithm.

15. A system comprising: hardware processing circuitry, and hardware memory comprising instructions which, when executed by the hardware processing circuitry to perform actions comprising:

capturing an image including a two-dimensional optical pattern, the two-dimensional optical pattern comprising a plurality of optical quadrants each comprising at least one optical cell, wherein said two-dimensional optical pattern is hand written;

determining contours of the two-dimensional optical pattern included in the image;

determining locations in two dimensions of the plurality of optical quadrants by identifying contours of each optical quadrant of the two-dimensional optical pattern;

determining locations in two dimensions of each of the at least one optical cells within each respective optical quadrant;

locating a plurality of two-dimensional geometric shapes in each optical cell that are spliced apart from each other at predetermined locations in the optical cell with respect to the optical quadrant; and determining the information content of the two-dimensional optical pattern.

16. The system of claim 15, wherein said two-dimensional optical pattern, comprises a plurality of optical cells carrying 20 bits information.

17. The system of claim 15 wherein said obtaining said information comprises decoding said information.

* * * * *

UNITED STATES PATENT AND TRADEMARK OFFICE
CERTIFICATE OF CORRECTION

PATENT NO. : 12,236,314 B2
APPLICATION NO. : 18/182751
DATED : February 25, 2025
INVENTOR(S) : Emrah Gozcu Page 1 of 1

It is certified that error appears in the above-identified patent and that said Letters Patent is hereby corrected as shown below:

On the Title Page

In Column 1, below item (63), insert -- (30) Foreign Application Priority Data
Sep. 13, 2020 (UK).............................2014378.0 --.

Signed and Sealed this
Twenty-seventh Day of May, 2025

Coke Morgan Stewart
*Acting Director of the United States Patent and Trademark Office*